US005232273A

United States Patent [19]

Eckstein et al.

[11] Patent Number: 5,232,273

[45] Date of Patent: Aug. 3, 1993

[54] BRAKE SYSTEM PUMP WITH A DAMPER CHAMBER WITH LEAF SPRING AND CUP CLOSURE

[75] Inventors: Ursula Eckstein, Schwieberdingen; Martin Eggenmueller, Renningen; Wolfgang Schuller, Sachsenheim; Rolf Hummel, Steinenbronn, all of Fed. Rep. of Germany

[73] Assignee: Robert Bosch GmbH, Stuttgart, Fed. Rep. of Germany

[21] Appl. No.: 834,095

[22] Filed: Feb. 12, 1992

[30] Foreign Application Priority Data

Mar. 13, 1991 [DE] Fed. Rep. of Germany ....... 4107979

[51] Int. Cl.⁵ ......................... F04B 21/02; B60T 8/40; B60K 28/16

[52] U.S. Cl. .................................. 303/116.4; 303/11; 303/901; 267/161; 137/539; 251/337; 417/569

[58] Field of Search ............. 303/10, 11, 116.3, 116.4, 303/DIG. 900, DIG. 901; 267/158-159, 161, 164; 417/569, 554; 137/539, 512, 454.5; 251/337

[56] References Cited

U.S. PATENT DOCUMENTS

| | | | |
|---|---|---|---|
| 2,401,856 | 6/1946 | Brock | 251/337 X |
| 3,483,888 | 12/1969 | Wurzel | 137/539 |
| 4,988,147 | 1/1991 | Zirps | 303/116 |
| 5,123,819 | 6/1992 | Schuller et al. | 417/569 |

FOREIGN PATENT DOCUMENTS

| | | | |
|---|---|---|---|
| 2419010 | 11/1974 | Fed. Rep. of Germany | 303/10 |

*Primary Examiner*—Robert J. Oberleitner
*Assistant Examiner*—Josie A. Ballato
*Attorney, Agent, or Firm*—Edwin E. Greigg; Ronald E. Greigg

[57] ABSTRACT

The object is to shorten the installation length of the pump. The high-pressure pump has a pump housing with a bore, in which a pump element having a cylinder, a piston longitudinally movable therein and an outlet valve is received. The cylinder is screwed into the bore and axially fixed at a bore step. The outlet valve has a ball, received in a hollow-cylindrical extension of the cylinder and loaded on its end remote from the valve seat by a leaf spring secured to the cylinder. The hydraulic high-pressure pump is usable in particular in motor vehicle brake systems having an anti-lock and possibly traction control system.

3 Claims, 1 Drawing Sheet

BRAKE SYSTEM PUMP WITH A DAMPER CHAMBER WITH LEAF SPRING AND CUP CLOSURE

BACKGROUND OF THE INVENTION

The invention is based on a hydraulic high-pressure pump for motor vehicle brake systems.

A high-pressure pump of this kind having a pump element is already known (German Offenlegungsschrift 39 07 969) U.S. Pat. No. 4,988,147, the cylinder of which has a solid valve housing on the side of the outlet valve. The ball of outlet valve and a helical compression spring that engages the ball are received in the valve housing. The cylinder with the outlet valve and valve housing forms an assembly unit that is inserted into a bore of the pump housing and is supported on a step of the bore by a collar of the cylinder. A disk-shaped closure element that is seated on the valve housing is fitted tightly into the pump housing bore, which is widened in the region of the valve housing. A damper chamber, which communicates with the outlet valve and from which a throttle bore of the pump housing begins, extends around the valve housing between the bore step and the closure element. A closure screw threaded into the pump housing bore fixes not only the cylinder with the valve housing but also the closure element.

This known embodiment of the high-pressure pump is of time-tested construction. Because of the valve housing, which is required to receive the helical compression spring and the valve ball and also to hold down the cylinder in the pump housing, the pump element has a certain structural length, which necessitates a correspondingly large installation space in the pump housing. Moreover, the increased volumetric requirement is also dictated by the embodiment of the damper chamber in the form of an annular chamber and by the fixation of the pump element and closure element with the closure screw.

OBJECT AND SUMMARY OF THE INVENTION

The high-pressure pump according to the invention has an advantage over the prior art that the pump element is distinguished by a reduced structural length, since a separate valve housing can be dispensed with, and a leaf spring requires very little space, compared with a helical compression spring. The guidance of the outlet valve ball in the cylinder extension is advantageous, because this reduces the operating noise of the valve.

Threading the cylinder in a bore is especially advantageous; it reduces the installation space required by the pump element compared with the known prior art, because the screwed-in pump element does not need any additional fastening element.

A hollowed out cup shaped closure element held in place by a snap ring is especially advantageous, because the shape of the closure element represents a gain in volume for the damper chamber. Consequently, a further reduction of the space required for the pump element and damper chamber in the pump housing is possible. Since for its fastening the pump element needs no additional component, a stop embodied by the snap ring is entirely adequate to serve as a positional fixation for the closure element.

The invention will be better understood and further objects and advantages thereof will become more apparent from the ensuing detailed description of a single preferred embodiment taken in conjunction with the drawings.

DESCRIPTION OF THE PREFERRED EMBODIMENT

Figure 1:
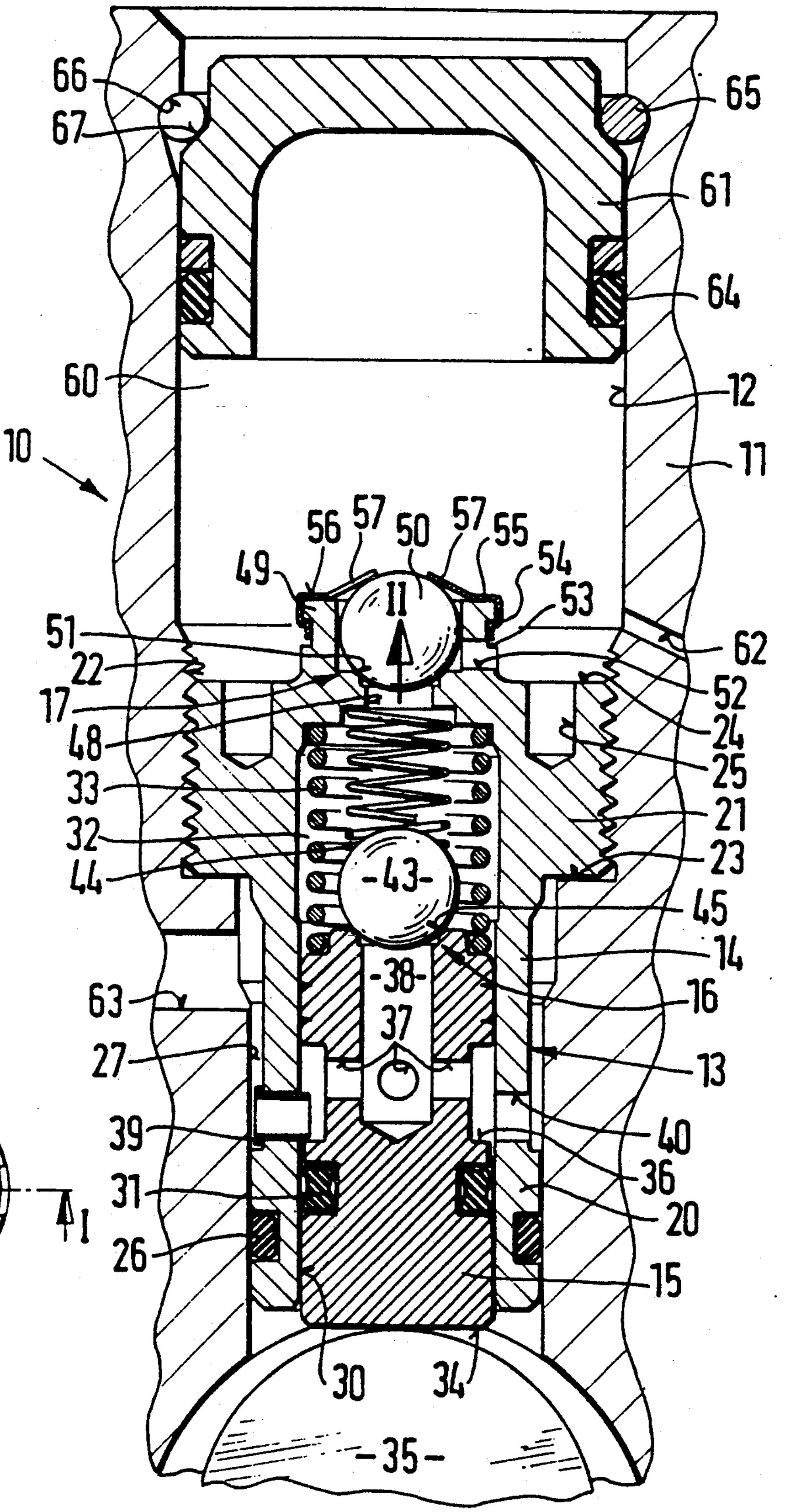
FIG. 1 is a longitudinal section through a pump housing with a pump element and a damper chamber.

The exemplary embodiment shown in the drawing relates to a hydraulic high-pressure pump 10 for motor vehicle brake systems having an anti-lock and possibly a traction control system.

The high-pressure pump 10 has a pump housing 11 with a stepped bore 12. A pump element 13 is received in the bore 12. The pump element comprises a cylinder 14, with a piston 15 longitudinally movable in it, an inlet valve 16 and an outlet valve 17.

The cylinder 14 of the pump element 13 has a thin-walled segment 20, which changes into a collar 21 with an external thread. The cylinder 14 is screw-threaded by its collar 21 into a segment 22 of the pump housing bore 12 having an internal thread until it meets a step 23 of the bore of the pump housing 11. For access by a screwdriving tool, shown in FIG. 3, the cylinder 14 is provided with recesses in the form of longitudinal bores 25 on its free face end 24 remote from the bore step 23. The segment 20 of the cylinder 14 is provided with a sealing ring 26 and fittingly engages a bore segment 27 of the pump housing bore 12 that follows the bore step 23.

The cylinder 14 has a longitudinal bore 30 that receives the piston 15 with a sealing ring 31. The piston 15 in the cylinder 14 defines a positive displacement chamber 32, with a restoring spring 33 in the form of a helical compression spring received in it; this spring engages the cylinder 14 at one end and the piston 15 at the other. Under the influence of the restoring spring 33, the piston 15 is supported by its free face end 34 on an eccentric 35 of a drive mechanism, not shown, of the hydraulic high-pressure pump 10. The piston 15 has a circumferential groove 36, at which transverse bores 37 begin, which merge with a blunt-ended longitudinal bore 38 of the piston 15. The circumferential groove 36 of the piston 15 is engaged by a hollow rivet 39, which is seated in a transverse bore 40 of the cylinder 14. The hollow rivet 39 prevents the piston 15, which is subject to the initial stress of the restoring spring 33, from escaping from the cylinder 14 if the pump element 13 is not yet installed in the pump housing 11. In the drawing, the piston 15 assumes its position at the end of a supply stroke.

The inlet valve 16 has a ball 43, received in the positive displacement chamber 32, as its closing element. The ball is under the influence of a prestressed valve spring 44, embodied as a helical compression spring, which is received coaxially with the restoring spring 33 in the positive displacement chamber 32 and is supported on the cylinder 14. The ball 43 cooperates with a valve seat 45 at the mouth, oriented counter to the positive displacement chamber 32, of the longitudinal bore 38 of the piston 15.

Figure 2:
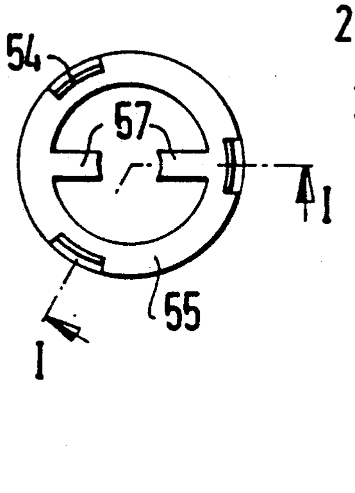
FIG. 2 shows a view of a body, secured to the pump element and having leaf springs, seen in the direction of the arrow II of FIG. 1.

An outlet bore 48 connects the positive displacement chamber 32 with the outlet valve 17 and extending coaxially with the outlet valve begins at the positive displacement chamber 32. The outlet bore discharges into a hollow-cylindrical extension 49 of the cylinder 14 that protrudes coaxially past the free face end 24. A ball 50 serving as the closing element for the outlet valve 17 is received in the hollow-cylindrical extension 49. The ball 50 cooperates with a valve seat 51 that defines the outlet bore 48. Near the valve seat 51, the hollow-cylindrical extension 49 is provided with a transverse bore 52. The hollow-cylindrical extension 49 also has a circumferential groove 53 for the engagement of three spring clasps 54 of a spring body 55 of the outlet valve 17 (see the sectional line I—I of FIG. 2). The spring body 55, embodied in the shape of an annular disk, from the outer circumference of which the evenly distributed spring clasps 54 begin, oriented axially, extends along the free face end 56 of the hollow-cylindrical extension 49. Two diametrically opposed leaf spring tongues 57, (shown in FIG. 2) extending radially inward, begin at the inside circumference of the spring body 55. The leaf spring tongues 57 of the spring body 55 that is axially fixed to the hollow-cylindrical extension 49 engage the ball 50 on the side remote from the valve seat 51 of the outlet valve 17 and generate an initial stress.

The outlet valve 17 communicates, through the transverse bore 52 of the hollow-cylindrical extension 49, with a damper chamber 60 that is embodied by the bore 12 of the pump housing 11 and a cup-shaped closure element 61 that tightly closes this bore. From the damper chamber 60, a throttle bore 62 of the pump housing 11 extends to consumers, not shown, of the brake system. On the side of the cylinder 14, the damper chamber 60 is sealed off from the bore segment 27 by the collar 21 that engages the bore step 23 of the pump housing 11 with suitably high initial stress into which an inlet bore 63 for pressure fluid discharges to protect against a loss of pressure fluid. On the side of the closure element 61, the seal between the damper chamber 60 and the bore 12 is effected by means of a sealing ring 64 received circumferentially in the closure element. The closure element 61, guided fittingly in the bore 12 of the pump housing 11, is axially retained with a snap ring 65. The bore 12 has a groove 66 on the open end for receiving this snap ring 65. The snap ring 65, protruding by half its cross section from the groove 66, cooperates with a shoulder 67 of the closure element 61.

The mode of operation of the hydraulic high pressure pump 10 is as follows:

In the downward stroke (intake stroke) of the piston 15, the inlet valve 16 opens, and pressure fluid delivered through the inlet bore 63, the bore segment 27, the transverse bore 40, the circumferential groove 36, the transverse bores 37 and the longitudinal bore 38, flows into the positive displacement chamber 32. In the upward stroke (supply stroke) of the high pressure pump 10, the inlet valve 16 is closed, while the outlet valve 17 opens. The piston 15 therefore displaces pressure fluid from the positive displacement chamber 3 through the outlet bore 48 and the transverse bore 52 into the damper chamber 60. The pressure fluid, which presses the closure element 6; against the snap ring 65, can flow out of the damper chamber 60 through the throttle bore 62.

The spring body 55, which substantially contributes to shortening the structural length of the pump element 13, may be embodied differently from the exemplary embodiment described: for instance, the number of leaf spring tongues 57 may be three or four. Moreover, the fastening of the spring body 55 to the hollow-cylindrical extension 49 can be done with a different number of spring clamps 54 or in some other way.

The foregoing relates to a preferred exemplary embodiment of the invention, it being understood that other variants and embodiments thereof are possible within the spirit and scope of the invention, the latter being defined by the appended claims.

What is Claimed and Desired to be Secured by Letters Patent of the United States is:

1. A hydraulic high-pressure pump (10) for motor vehicle brake systems having an anti-lock and traction control system, comprising at least one pump element (13), a cylinder (14) and a piston (15), longitudinally movable in said cylinder and defining a positive displacement chamber (32), and an outlet valve (17), the cylinder (14) is received in a bore (12) of a pump housing (11) and is axially fixed on a bore step (23), the cylinder (14) is screw-threaded into the bore (12) of the pump housing (11) and has a collar (21) provided with an external thread, which collar is provided on a free face end (24) remote from the bore step (23) with recesses for engagement of a screwdriving tool, on an outlet side of the positive displacement chamber (32), the cylinder (14) has a valve seat (51), which is engaged by a spring-loaded ball (50) as a closing element of the outlet valve (17), the ball (50) of the outlet valve (17) is guided in a coaxial hollow-cylindrical extension (49) of the cylinder (14) and the hollow-cylindrical extension (49) of the cylinder (14) has on an end face an annular disk-shaped body (55) from which at least two evenly distributed and at least approximately radially extending leaf spring tongues (57) extend, and from which at least three evenly distributed at least approximately axially oriented spring clasps (54) are at an outer circumference of the annular disk-shaped body (55) and engage a circumferential groove (53) of the hollow-cylindrical extension (49).

2. A hydraulic high-pressure pump as defined by claim 1, having a closure element (61) tightly closing off the bore (12) of the pump housing (11) and having a damper chamber (60) located between the cylinder (14) and the closure element (61), from which chamber a throttle bore (62) of the pump housing (11) begins, in which the closure element (61) is hollowed out in cup-shaped fashion toward the cylinder (14) and is axially held by a snap ring (65).

3. A hydraulic high pressure pump as defined by claim 1, which includes an inlet valve (43) in said displacement chamber (32), and an inlet valve seat on an axial bore in said piston (15) upon which said inlet valve seats.

* * * * *